United States Patent [19]
Southgate

[11] 3,842,276
[45] Oct. 15, 1974

[54] THERMAL RADIATION DETECTOR

[75] Inventor: Peter David Southgate, Princeton, N.J.

[73] Assignee: RCA Corporation, New York, N.Y.

[22] Filed: June 15, 1973

[21] Appl. No.: 370,479

[52] U.S. Cl.................. 250/336, 250/338, 250/370
[51] Int. Cl. ............................................ G01t 1/24
[58] Field of Search..................... 250/336, 338, 370

[56] References Cited
UNITED STATES PATENTS

| | | | |
|---|---|---|---|
| 2,951,175 | 8/1960 | Null .............................. | 250/332 X |
| 3,207,902 | 9/1965 | Sanborg............................ | 250/370 |
| 3,529,161 | 9/1970 | Oosthoek et al.................... | 250/370 |
| 3,581,091 | 5/1971 | Meijer............................... | 250/370 |

Primary Examiner—Archie R. Borchelt
Attorney, Agent, or Firm—Glenn H. Bruestle; Donald S. Cohen

[57] ABSTRACT

A sheet of a pyroelectric material has a separate set of spaced, metal film electrodes on each of its opposed surfaces. Each of the electrodes of one of the sets overlaps two electrodes of the other set so as to form in the sheet a plurality of thermal sensitive elements which are electrically connected in a series path along the sheet. By uniformly polarizing the sheet in a single direction and combining it with a grating, the voltage response of the series path of the thermal sensitive elements is sensitive to the moving warm body but is substantially insensitive to changes in the ambient temperature. By polarizing the sheet so that adjacent elements are polarized in alternating opposite directions, the device is sensitive to changes in the ambient temperature.

7 Claims, 3 Drawing Figures

PATENTED OCT 15 1974　　3,842,276

THERMAL RADIATION DETECTOR

BACKGROUND OF THE INVENTION

The present invention relates to a detector for thermal radiation, and particularly to a thermal detector for detecting the motion of warm bodies.

Pyroelectric materials are homogeneous materials which can be polarized so that they are sensitive to thermal radiation in that they provide a voltage response when subjected to a change in temperature. Such materials include polyvinylidene fluoride, triglycine sulfate, triglycine selenate, triglycine fluorberyllate, strontium barium niobate, lead zirconate titanate, etc. Thermal sensors made from such pyroelectric materials have the convenient property of operating at room temperature. They are, therefore, very suitable for sch applications as burglar alarms, industrial monitors, and other surveillance systems. However, heretofore the use of these materials as detectors for surveillance systems has been impractical because these materials have the disadvantages that their voltage response to a nearby source of heat is quite small while small fluctuations of ambient temperature give a relatively large response. For use as a detector in a surveillance system, it is desirable that the detector provide a relatively large voltage response to changes in the thermal radiation being monitored while being substantially insensitive to changes in the ambient temperature.

SUMMARY OF THE INVENTION

A radiation detector is provided including a body of a radiation sensitive, homogeneous material having a pair of opposed surfaces. A first set of spaced, parallel electrodes is on one of the opposed surfaces and a second set of spaced, parallel electrodes is on the other of the opposed surfaces. Each of the electrodes of one of the sets overlaps two electrodes of the other set so as to provide a series electrical path between the sets of electrodes through and along the body.

DETAILED DESCRIPTION

Figure 1:
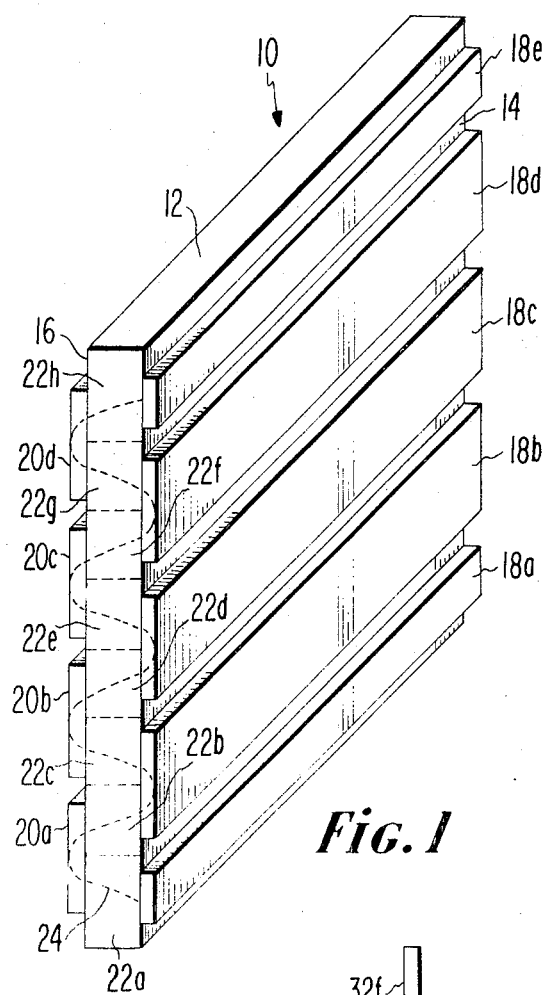
FIG. 1 is a perspective view of a form of the thermal radiation detector of the present invention.

Referring initially to FIG. 1, a form of the thermal radiation detector of the present invention is generally designated as 10. Detector 10 comprises a sheet 12 of a radiation-sensitive, homogeneous material having opposed surfaces 14 and 16. The radiation-sensitive sheet 12 is preferably of a pyroelectric material, such as polyvinylidene fluoride, triglycine sulfate, strontium barium niobate, lead zirconate titanate, etc. On the surface 14 of the sheet 12 is a set of spaced, parallel metal film electrodes 18a, 18b, 18c, 18d, and 18e. The electrodes 18a–18e are uniformly spaced apart, and, as shown, the end electrodes 18a and 18e are narrower than the intermediate electrodes 18b, 18c, and 18d. The intermediate electrodes 18b, 18c, and 18d are of uniform width. On the surface 16 of the sheet 12 is a second set of spaced, parallel metal film electrodes 20a, 20b, 20c, and 20d. The electrodes 20a–20d are uniformly spaced apart and are of uniform width. Each of the electrodes 20a–20d overlaps two of the electrodes 18a–18e. Thus, electrode 20a overlaps the electrode 18a and a portion of the electrode 18b. Electrode 20b overlaps a portion of each of the electrodes 18b and 18c. The electrode 20c overlaps a portion of each of the electrodes 18c and 18d, and the electrode 20d overlaps the electrode 18e and a portion of 18d.

In the detector 10, the portion of the sheet 12 between each pair of overlapping electrodes forms an individual thermal detector element. Since there are a plurality of overlapping electrode portions, there is provided a plurality of the individual thermal detector elements in substantially side-by-side relation across the sheet 12. Although there is no actual physical boundary between the individual detector elements, the detector elements are designated as being the portions 22a–22h respectively between the dash lines to provide a clearer understanding of how the detector 10 operates. The arrangement of the two sets of electrodes 18a–18e and 20a–20d places the side-by-side thermal detector elements 22a–22h in a series connection from the electrode 18a to the electrode 18e, as indicated by the wavy dashed line 24.

Figure 2:
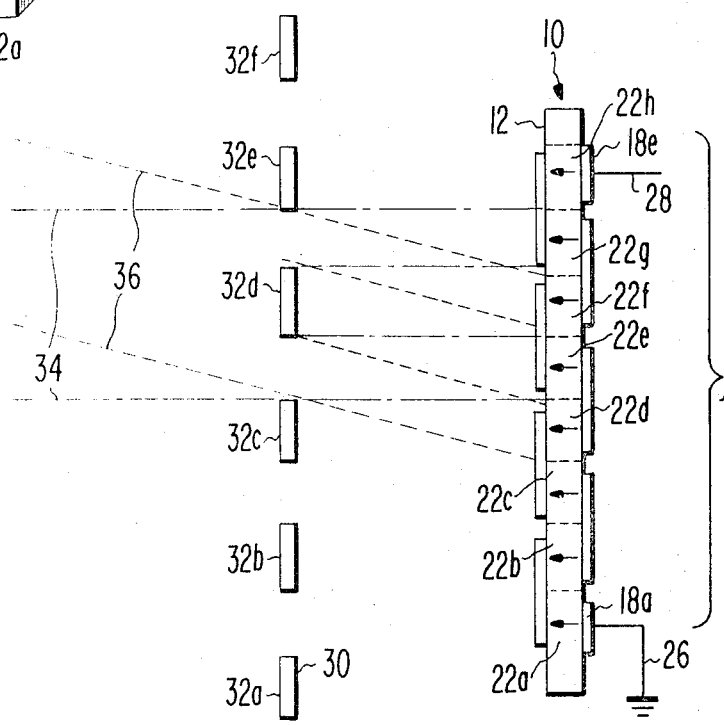
FIG. 2 is a schematic view of a surveillance device using a form of the detector of the present invention.

Referring to FIG. 2 there is shown a surveillance device using a form of the thermal radiation detector 10. For the surveillance device the radiation sensitive sheet 12 of the detector 10 is uniformly polarized in a single direction as indicated by the arrows in FIG. 2. As is well known, the radiation sensitive sheet 12 is so polarized by applying a uniform voltage between the surfaces 14 and 16 of the sheet while slightly heating the sheet. The electrode 18a is connected by line 26 to ground and the electrode 18e is connected by a line 28 to suitable circuitry for detecting the output signal from the detector 10. Thus, the individual detector elements 22a–22h are electrically connected in a series path between the lines 26 and 28.

A grating 30 extends parallel to and is spaced from the surface 16 of the detector 10. The grating 30 includes a plurality of spaced, parallel bars 32a–32f which extend parallel to the electrodes of the detector 10. The bars 32a–32f are each of a width equal to the width of the detector elements 22a–22h and are spaced apart a distance equal to the width of the detector elements. The grating 30 is positioned so that the bars extend across alternating elements of the detector. As shown in FIG. 2, the bars 32b–32e extend across the elements 22b, 22d, 22f and 22h, respectively.

In the detector 10, since all of the detector elements are polarized in the same direction and are electrically connected in a series path between the lines 26 and 28, a voltage generated across each of the elements 22a, 22c, 22e, and 22g by a change in temperature of the radiation sensitive sheet 12 will be of one polarity, whereas the voltage generated across each of the detector elements 22b, 22d, 22f and 22h will be of the opposite polarity. Thus, a uniform change in temperature of the entire radiation sensitive sheet 12, such as is caused by a change in the ambient temperature, will generate voltages in the detector elements which will cancel each other. Therefore, the detector 10 is insensitive to changes in the ambient temperature.

However, if a thermal radiating body is located on the side of the grating 30 away from the detector 10 and moves across the grating, the detector 10 will produce an output signal. For example, if the thermal radiating body starts at a position in the direction of the lines 34—34, the thermal radiation from the body will flow to the detector 10 along the lines 34—34. However, the bar 32d of the grating 30 will block some of the thermal radiation so that the thermal radiation will only fall on the detector elements 22e and 22g causing these elements to heat up and generate a voltage. If the body then moves so that it lies in the direction of the lines 36—36, the thermal radiation from the body will then flow to the detector 10 along the lines 36—36. The bar 32d of the grating 30 will then block a portion of the thermal radiation so that the thermal radiation will only fall on the elements 22d and 22f of the detector 10, causing these elements to heat up and generate a voltage. However, when the thermal radiating body moves from its position in the direction of the lines 34—34 to the position in the direction of the lines 36—36, the thermal radiation is removed from the detector elements 22e and 22g. Thus, this movement of the thermal radiating body causes the elements 22e and 22g to cool down and at the same time causes the elements 22d and 22f to heat up.

When the elements 22e and 22g cool down, they generate a voltage which is of a polarity opposite to that of the voltage generated when they were heated up. As previously stated, when the elements 22d and 22f are heated up, they also generate a voltage which is of a polarity opposite to that of the voltage generated when the elements 22e and 22g are heated up. Thus, the cooling of the elements 22e and 22g and the heating of the elements 22d and 22f generates across each of these elements voltages of the same polarity so as to provide a signal from the detector 10 equal to the combined voltages of all four of these elements. This output signal is detected by the circuitry to which the line 28 is connected and can be used to operate a signal device, such as a light or an alarm.

If the warm body moves completely across the surveillance device, alternating detector elements are heated up while the elements between the heated up elements are cooled down to provide an indication of the movement of the warm body in the manner described above. As the warm body moves across the surveillance device, the elements which are first heated up are then cooled down by the movement of the warm body, causing the output signal from the detector 10 to reverse polarity. This provides an alternating signal which can be separated by the circuitry to which the detector 10 is connected from steady signals which might result from drift. Thus, the surveillance device using the detector 10 provides an indication of the movement of a warm body thereacross. The warm body may be any type of body which radiates thermal energy, such as a human being or a mechanical device.

Figure 3:
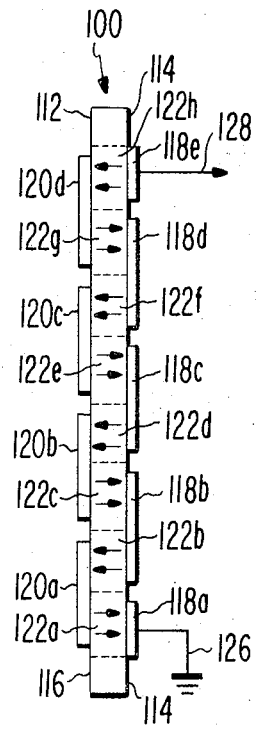
FIG. 3 is an edge view of another form of the thermal radiation detector of the present invention.

Referring to FIG. 3, another form of the thermal radiation detector of the present invention is generally designated as 100. The thermal radiation detector 100 is of the same construction as the thermal radiation detector 10 except that the radiation sensitive sheet 112 is polarized such that the detector elements 122a, 122c, 122e and 122g are polarized in one direction and the detector elements 122b, 122d, 122f and 122h are polarized in the opposite direction, as indicated by the arrows in FIG. 3. As in the thermal radiation detector 10, the detector elements 122a–122h are electrically connected in a series path between the ground line 126 and the line 128 by the metal film electrodes 118a–118e on the surface 114 of the radiation sensitive sheet 112 and the electrodes 120a–120d on the surface 116 of the sheet. Since alternating ones of the detector elements 122a–122h are polarized in opposite directions, a uniform heating of all of the detector elements will generate voltages across each of the elements of the same polarity along the electrical path between the lines 126 and 128. Thus, a uniform heating or cooling of the radiation sensitive sheet 112, such as may be caused by a change in the ambient temperature, will provide an output signal from the thermal detector 100 equal to the combined voltages generated across all of the detector elements. Therefore, the thermal radiation detector 100 can be used to provide an indication of changes in the temperature of the ambient in which the radiation detector 100 is located, as well as indicate the incident radiation.

Thus, there is provided by the present invention a thermal detector device which includes a sheet of a thermal sensitive material having therein a plurality of side-by-side thermal detector elements which are electrically connected in a series path so as to provide an output signal which is the combined output signals of a plurality of the detector elements. By polarizing all of the detector elements in the same direction and combining the detector with a grating, there is provided a surveillance device which will indicate the movement of a warm body thereacross but which is insensitive to changes in the ambient temperature. By polarizing alternating ones of the detector elements in opposite directions, the radiation detector can be used to indicate changes in the ambient temperature.

Although the thermal detector of the present invention has been shown with straight, parallel metal film electrodes, the electrodes can be arranged as concentric circles or ovals or can be a pattern of any other shaped metal areas. No matter what shape of electrodes is used, each of the electrodes on one surface of the radiation-sensitive sheet should overlap two electrodes on the opposite surface of the sheet and the electrodes should be arranged in a pattern to provide the electrical series connection between the electrodes and through the sheet.

I claim:

1. A radiation detector comprising a body of a radiation-sensitive, homogeneous material having a pair of opposed surfaces,
   a first set of spaced electrodes on one of said opposed surfaces,
   a second set of spaced electrodes on the other of said opposed surfaces,
   each of the electrodes of one of said sets overlapping two electrodes of the other of said sets, with each pair of overlapping electrodes forming an individual detector element in said body with all of said individual detector elements being connected in a series arrangement between said sets of electrodes through and along said body.

2. A radiation detector in accordance with claim 1 in which the number of electrodes in each set is sufficient to provide an even number of the individual detector elements.

3. A radiation detector in accordance with claim 1 in which the body is polarized in a uniform direction between said surfaces.

4. A radiation detector in accordance with claim 3 including a grating extending parallel to but being spaced from one of said surfaces of the body, said grating including a plurality of spaced bars which extend parallel to the electrodes on said body.

5. A radiation detector in accordance with claim 4 in which the bars of the grating are each of a width equal to the width of the detector elements and are spaced apart a distance equal to the width of the detector elements.

6. A radiation detector in accordance with claim 5 in which at least one of the adjacent bars of the grating extend across alternate ones of the detector elements.

7. A radiation detector in accordance with claim 1 in which the body is polarized so that alternate ones of the detector elements are polarized in opposite directions between said surfaces of the body.

* * * * *